US012639069B2

(12) United States Patent
    Chaffin et al.

(10) Patent No.: US 12,639,069 B2
(45) Date of Patent: May 26, 2026

(54) PROVIDING ADDITIONAL OPERATIONS FOR A FUNCTIONAL UNIT OF A PROCESSOR CORE

(71) Applicant: Ampere Computing LLC, Santa Clara, CA (US)

(72) Inventors: Benjamin Crawford Chaffin, Portland, OR (US); Jacob Daniel Morgan, Forest Grove, OR (US); Christopher Palistrant, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 9 days.

(21) Appl. No.: 18/490,628

(22) Filed: Oct. 19, 2023

(65) Prior Publication Data

US 2025/0130798 A1     Apr. 24, 2025

(51) Int. Cl.
    *G06F 9/30*          (2018.01)
    *G06F 21/72*         (2013.01)

(52) U.S. Cl.
    CPC ........ *G06F 9/30036* (2013.01); *G06F 9/3001* (2013.01); *G06F 9/30029* (2013.01); *G06F 9/30032* (2013.01); *G06F 21/72* (2013.01)

(58) Field of Classification Search
    None
    See application file for complete search history.

(56) References Cited

U.S. PATENT DOCUMENTS

| | | | | | |
|---|---|---|---|---|---|
| 5,598,547 A | * | 1/1997 | Beard | ................... | G06F 9/3873 |
| | | | | | 712/E9.055 |
| 6,434,690 B1 | * | 8/2002 | Ohsuga | ................. | G06F 9/3877 |
| | | | | | 712/E9.046 |
| 7,320,063 B1 | * | 1/2008 | Grohoski | .............. | G06F 9/3861 |
| | | | | | 712/214 |
| 7,533,248 B1 | * | 5/2009 | Golla | .................... | G06F 9/3877 |
| | | | | | 712/214 |

(Continued)

FOREIGN PATENT DOCUMENTS

| | | | | | |
|---|---|---|---|---|---|
| EP | | 0681236 A1 | * | 8/1995 | ............. G06F 9/302 |
| WO | WO-03036508 A2 | | * | 5/2003 | ........... G06F 1/3203 |

OTHER PUBLICATIONS

CueMath 'What is the difference between a subset and a proper subset?' from archive Oct. 4, 2022. (Year: 2022).*

(Continued)

*Primary Examiner* — Steven G Snyder

(74) *Attorney, Agent, or Firm* — Muncy, Geissler, Olds & Lowe, P.C.

(57)                    ABSTRACT

Aspects of the disclosure relate generally to the design of the functional units of a processor core, and more specifically, to adding logical operations of a first functional unit of a processor core to a second functional unit of the processor core. In an aspect, a processor core includes a first functional unit configured to provide first functionality, wherein the first functional unit includes circuitry configured to perform a first set of logical operations, a second functional unit configured to provide second functionality different from the first functionality, wherein the second functional unit (Continued)

includes circuitry configured to perform a subset of logical operations of the first set of logical operations, and a data bus connecting the first functional unit and the second functional unit.

18 Claims, 3 Drawing Sheets

(56)                References Cited

U.S. PATENT DOCUMENTS

| | | | | |
|---|---|---|---|---|
| 7,620,821 | B1 * | 11/2009 | Grohoski | G06F 9/3851 |
| | | | | 380/37 |
| 8,566,607 | B2 * | 10/2013 | Flynn | G06F 12/1408 |
| | | | | 711/138 |
| 8,667,042 | B2 * | 3/2014 | Wiedemeier | G06F 9/30014 |
| | | | | 712/7 |
| 11,200,347 | B1 * | 12/2021 | Dropps | G06F 21/44 |
| 2006/0174137 | A1 * | 8/2006 | Carr | G06F 21/85 |
| | | | | 713/189 |
| 2007/0050641 | A1 * | 3/2007 | Flynn | G06F 9/383 |
| | | | | 713/193 |
| 2012/0078992 | A1 * | 3/2012 | Wiedemeier | G06F 9/30014 |
| | | | | 708/523 |
| 2016/0094552 | A1 * | 3/2016 | Durham | G06F 21/00 |
| | | | | 713/171 |

OTHER PUBLICATIONS

'Hardware Design and Implementation of Role-Based Cryptography' Masters Theses by Scott Edward Fields, Dec. 2005. (Year: 2005).*

'On Permutation Operations in Cipher Design' by Ruby B. Lee et al., copyright 2004, IEEE. (Year: 2004).*

'Design and implementation of a versatile cryptographic unit for RISC processors' by Kazim Yumbul et al., Published online May 10, 2012 in Wiley Online Library. (Year: 2012).*

Machine Translation of Chinese Patent Application CN 117687693 A, published 2024. (Year: 2024).*

* cited by examiner

300

310

Perform, by a first functional unit of the processor core configured to provide first functionality, a first set of logical operations

320

Perform, by a second functional unit of the processor core configured to provide second functionality different from the first functionality, a subset of logical operations of the first set of logical operations.

PROVIDING ADDITIONAL OPERATIONS FOR A FUNCTIONAL UNIT OF A PROCESSOR CORE

BACKGROUND OF THE DISCLOSURE

1. Field of the Disclosure

Aspects of the disclosure relate generally to the design of the functional units of a processor core, and more specifically, to adding logical operations of a first functional unit of a processor core to a second functional unit of the processor core.

2. Description of the Related Art

A system-on-a-chip (SoC) may include multiple processor cores, and each processor core may include multiple functional units. The multiple cores may be connected to each other over a data bus, and the multiple functional units within each core may likewise be connected to each other over a data bus. The functional units within a core may be responsible for performing certain functions. For example, the functional units may include a single precision floating point functional unit, a double precision floating point functional unit, a vector integer functional unit, a bfloat functional unit, a cryptographic functional unit, and so on. Each functional unit may include hardware circuitry for performing certain operations related to its respective function. For example, the vector integer functional unit may include circuitry for performing the logical operations of AND, OR, XOR (exclusive OR), and ADD, various shift operations, and so on.

Functional unit circuitry is typically optimized to feed the result of one logical operation to a consumer of that logical operation within the same functional unit. However, if another functional unit needs the result of an operation in the functional unit, there may be a performance penalty incurred by moving the data between functional units (over the data bus). This is generally acceptable, as, for example, it is unlikely that the vector integer functional unit would need a result from a floating point functional unit.

However, in some cases, such as the cryptographic functional unit, complex encryption and/or hashing operations are frequently mixed with simple integer bit manipulations (as in the vector integer functional unit). This incurs frequent performance penalties, as data "bounces" back and forth over the data bus between the cryptographic functional unit and the vector integer functional unit. Simply merging the cryptographic and vector integer functional units would not adequately address this issue because the cryptographic circuitry is large and its integration into the vector integer functional unit would hurt the latency of the integer operations.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a processor core includes a first functional unit configured to provide first functionality, wherein the first functional unit includes circuitry configured to perform a first set of logical operations; a second functional unit configured to provide second functionality different from the first functionality, wherein the second functional unit includes circuitry configured to perform a subset of logical operations of the first set of logical operations; and a data bus connecting the first functional unit and the second functional unit.

In an aspect, a method of operating a processor core includes performing, by a first functional unit of the processor core configured to provide first functionality, a first set of logical operations; and performing, by a second functional unit of the processor core configured to provide second functionality different from the first functionality, a subset of logical operations of the first set of logical operations.

In an aspect, a processor core includes first means for providing first functionality, wherein the first means for providing first functionality includes circuitry configured to perform a first set of logical operations; second means for providing second functionality different from the first functionality, wherein the second means for providing second functionality includes circuitry configured to perform a subset of logical operations of the first set of logical operations; and a data bus connecting the first means for providing first functionality and the second means for providing second functionality.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
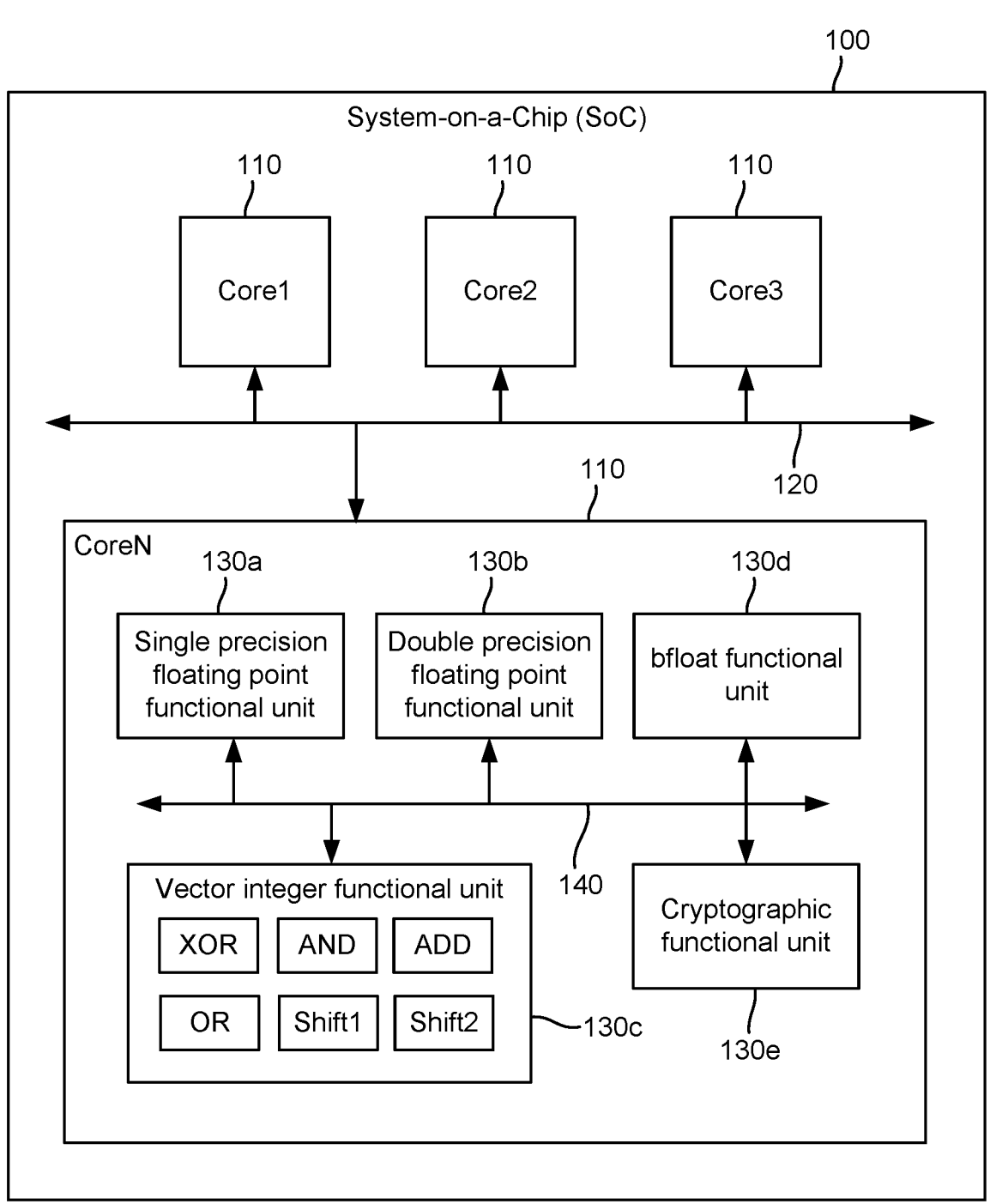
FIG. 1 is a diagram of a first example system-on-a-chip (SoC), according to aspects of the disclosure.

FIG. 1 is a diagram of an example system-on-a-chip (SoC) 100, according to aspects of the disclosure. The SoC 100 may include multiple processor cores 110 (labeled "Core1" to "CoreN") connected to each other over a data bus 120. Note that while FIG. 1 illustrates N=4 processor cores 110, as will be appreciated, there may be more or fewer than four processor cores 110.

Each processor core 110 may include multiple functional units 130a-e (collectively or generically referred to herein as functional unit(s) 130), which may likewise be connected to each other over a data bus 140. The functional units 130 within a processor core 110 may be responsible for performing certain functions/providing certain functionality. For example, as shown in CoreN, the functional units 130 may include a single precision floating point functional unit 130a, a double precision floating point functional unit 130b, a vector integer functional unit 130c, a bfloat functional unit 130d, a cryptographic functional unit 130e, and so on. Note that while FIG. 1 illustrates five specific functional units 130, as will be appreciated, this is merely an example, and a processor core 110 may have more, fewer, or different functional units 130 than the five functional units 130 illustrated.

As shown by the example of the vector integer functional unit 130c, each functional unit 130 may include hardware circuitry for performing certain logical operations related to its respective function. For example, the vector integer functional unit 130c may include circuitry for performing the logical operations of AND, OR, XOR (exclusive OR), and ADD, various shift operations, and so on. Note that while FIG. 1 illustrates the vector integer functional unit 130c including six specific operations, as will be appreciated, this is merely an example, and the vector integer functional unit 130c may include more, fewer, or different logical operations than the six operations illustrated.

Functional unit circuitry is typically optimized to feed the result of one logical operation to a consumer of that logical operation within the same functional unit 130. However, if another functional unit 130 needs the result of an operation in the functional unit 130, there may be a performance penalty incurred by moving the data between functional units (over the data bus 120). This is generally acceptable, as, for example, it is unlikely that the vector integer functional unit 130c would need a result from a floating point functional unit (e.g., single precision floating point functional unit 130a, double precision floating point functional unit 130b, bfloat functional unit 130d).

However, in some cases, such as a cryptographic functional unit 130e, complex encryption and/or hashing operations are frequently mixed with simple integer bit manipulations (as in the vector integer functional unit 130c). This incurs frequent performance penalties, as data "bounces" back and forth over the data bus 140 between the cryptographic functional unit 130e and the vector integer functional unit 130c. More specifically, every time data is transmitted over the data bus 140 between the cryptographic functional unit 130e and the vector integer functional unit 130c and vice versa, a performance cost in the form of some number of clock cycles is incurred. In this case, simply merging the cryptographic function unit 130e and the vector integer functional unit 130c would not adequately address this issue because the cryptographic circuitry is large and its integration into the vector integer functional unit would hurt the latency of the integer operations.

Accordingly, the present disclosure proposes to duplicate certain logical operations within a functional unit where the logical operations would not naturally belong, but in which some particular workload makes heavy use of the logical operations. The instruction decoder then detects the context of an instruction, or type of workload, and dynamically changes the instruction decoding based on that context or workload type.

For example, for a cryptographic functional unit, the most common logical vector integer operations that cause data to be transmitted back and forth between the cryptographic functional unit and the vector integer functional unit can be included in the cryptographic functional unit as local versions of these operations. Integer operations do not naturally belong in a cryptographic functional unit, but cryptographic workloads heavily use integer operations in combination with cryptographic instructions. The decoder therefore detects that an instruction is part of a cryptographic workload and routes the instruction to the cryptographic functional unit rather than an integer functional unit where the instruction would otherwise have been routed.

More specifically, when an instruction is decoded, the instruction decoder detects whether the instruction includes a cryptographic operation, and if so, decodes certain integer instructions differently so that they are sent to the cryptographic functional unit instead of the vector integer functional unit. That is, the instruction decoder typically translates instructions into a set of operations in a fixed way, meaning that the same instruction always decodes into the same set of operations. Thus, a specific set of operations can be handled by a fixed set of one or more functional units. In the present disclosure, however, the decoding of instructions into operations is no longer fixed—the same instruction may instead result in two different set of operations that are destined for different functional units based on historical considerations or other heuristics. For example, if any cryptographic functional unit instructions have been seen in, for example, the last 32 clock cycles in which instructions were decoded, the cryptographic functional unit may use the local versions of these instructions.

Hashing and encryption/decryption are increasingly important operations used to protect data integrity, storage de-duplication, and the like. Thus, while adding certain logical operations to the cryptographic functional unit marginally increases the physical size and power consumption of the cryptographic functional unit, it significantly improves the performance of the cryptographic functional unit.

Figure 2:
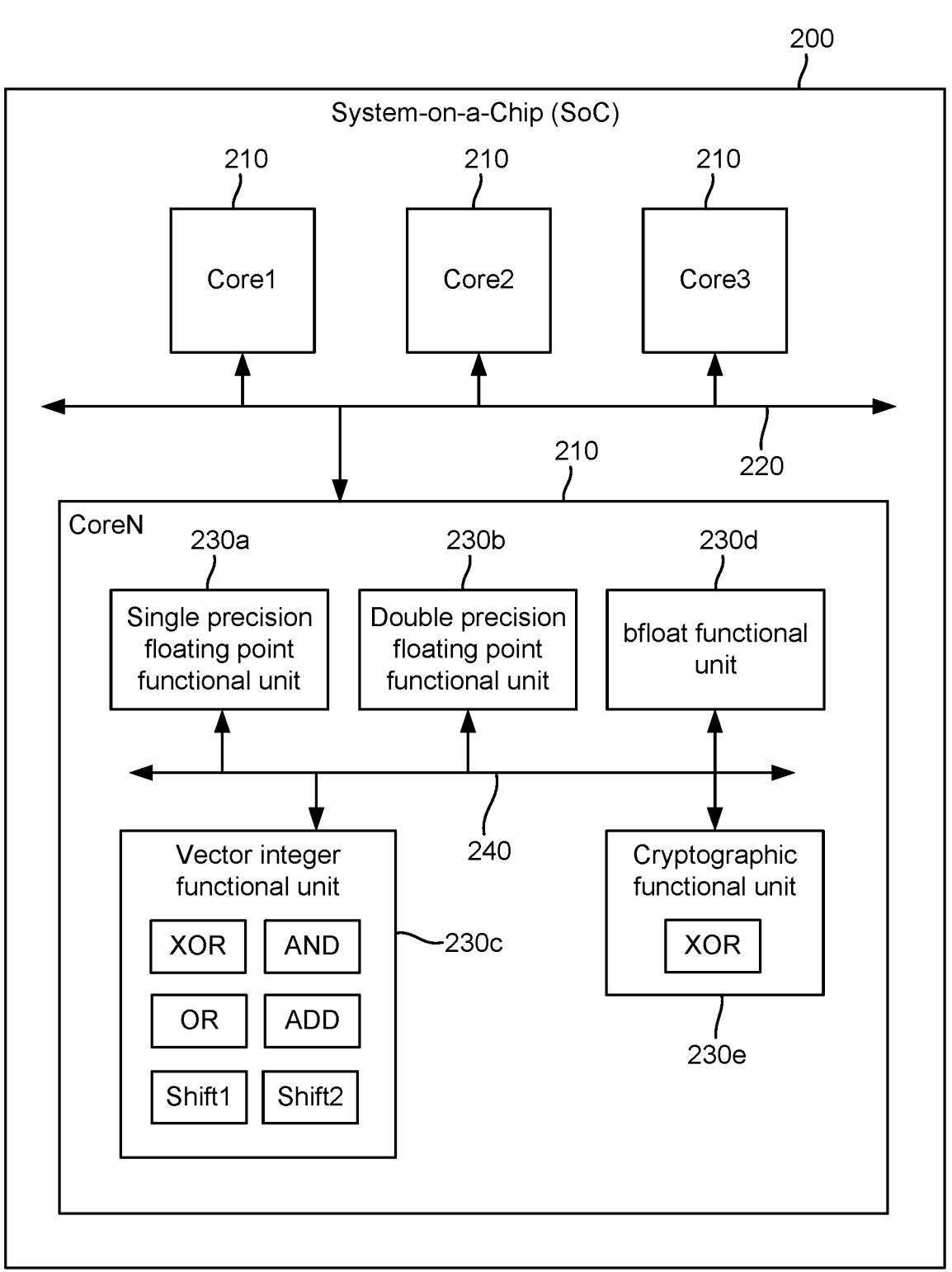
FIG. 2 is a diagram of a second example system-on-a-chip (SoC), according to aspects of the disclosure.

FIG. 2 is a diagram of an example system-on-a-chip (SoC) 200, according to aspects of the disclosure. Like the SoC 100, the SoC 200 may include multiple processor cores 210 (labeled "Core1" to "CoreN") connected to each other over a data bus 220. Note that while FIG. 2 illustrates N=4 processor cores 210, as will be appreciated, there may be more or fewer than four processor cores 210.

As in the example of FIG. 1, each processor core 210 may include multiple functional units 230*a-e* (collectively or generically referred to herein as functional unit(s) 230), which may likewise be connected to each other over a data bus 240. As shown in CoreN, the functional units 230 may include a single precision floating point functional unit 230*a*, a double precision floating point functional unit 230*b*, a vector integer functional unit 230*c*, a bfloat functional unit 230*d*, a cryptographic functional unit 230*e*, and so on. Note that while FIG. 2 illustrates five specific functional units 230, as will be appreciated, this is merely an example, and a processor core 210 may have more, fewer, or different functional units 230 than the five functional units 230 illustrated.

As shown by the example of the vector integer functional unit 230*c*, each functional unit 230 may include hardware circuitry for performing certain logical operations related to its respective function. For example, the vector integer functional unit 230*c* may include circuitry for performing the logical operations of XOR, AND, OR, and ADD, various shift operations, and so on. Note that while FIG. 2 illustrates the vector integer functional unit 230*c* including six specific operations, as will be appreciated, this is merely an example, and the vector integer functional unit 230*c* may include more, fewer, or different logical operations than the six operations illustrated.

In contrast to the cryptographic functional unit 130*e* illustrated in FIG. 1, the cryptographic functional unit 230*e* includes one or more logical operations that would otherwise require the cryptographic functional unit 230*e* to send data to another functional unit to perform the logical operation(s). For example, the cryptographic functional unit 230*e* may include one or more logical vector integer operations that would otherwise be performed by the vector integer functional unit 230*c*. Specifically, in the example of FIG. 2, the cryptographic functional unit 230*e* is shown as including the logical XOR operation. However, as will be appreciated, there may be more or different logical operations than the logical XOR operation.

Note that while the foregoing has described adding additional logical operations to the cryptographic functional unit 230*e*, as will be appreciated, this is not necessarily restricted to the cryptographic functional unit. Rather, additional logical operations could be added to any functional unit where data produced in one functional unit is commonly consumed in another functional unit. For example, simple "move" instructions, which just copy data from one register to another, could be included in each functional unit so that a functional unit never has to ship data across functional units just to copy the data.

The techniques of the present disclosure may be applied to any case where an instruction set architecture (ISA) has not implemented a complex or fused instruction. The disclosed techniques may also be applied where a specific complex instruction may not be practical in some general-purpose ISA. The disclosed techniques may also be applied where a complex instruction may exist in the ISA, but software fails to take advantage of the performance opportunity.

For example, in the absence of an ISA explicitly supporting complex functionality, the disclosed techniques may be used to implement an ADD functional unit and a MUL functional unit, where the latter also supports MLA (multiply with accumulate) functionality and the instruction decode functions in the manner described above Here, the operation "ADD" means (a+b) and the operation "MUL" means (a*b) (neither of which are simple logical operations in this example). Assuming that MUL commonly feeds a dependent ADD, the following expression can be added to the ISA: (a*b)+c (commonly referred to as an MLA operation).

Figure 3:
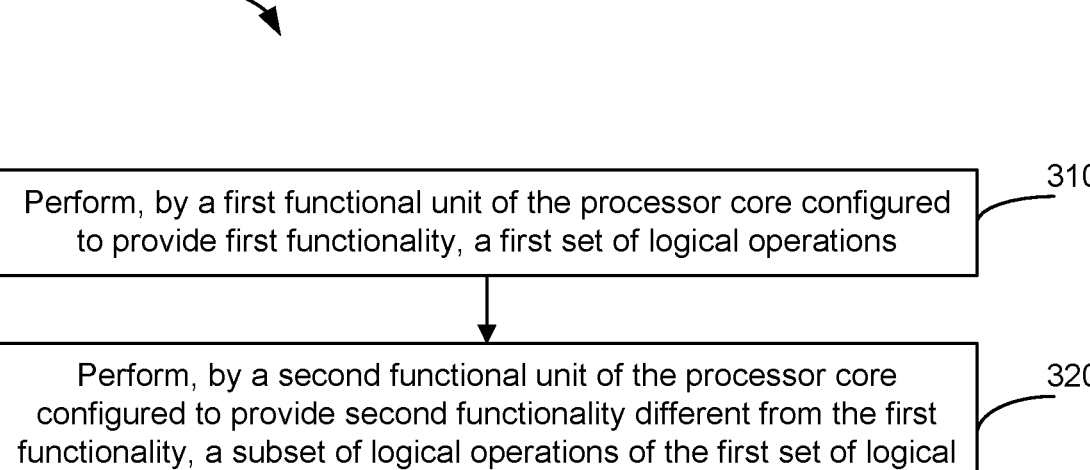
FIG. 3 illustrates an example method of operating a processor core, according to aspects of the disclosure.

FIG. 3 illustrates an example method 300 of operating a processor core (e.g., a processor core 130), according to aspects of the disclosure.

At operation 310, a first functional unit (e.g., a functional unit 230, such as vector integer functional unit 230*c*) of the processor core configured to provide first functionality (e.g., vector integer operation functionality) performs a first set of logical operations (e.g., a set of logical vector integer operations, such as AND, OR, XOR, MOVE, etc.).

At operation 320, a second functional unit (e.g., a functional unit 230, such as cryptographic functional unit 230*e*) of the processor core configured to provide second functionality (e.g., cryptographic functionality) different from the first functionality performs a subset of logical operations (e.g., XOR, MOVE) of the first set of logical operations.

In some cases, the method 300 may include (not shown) receiving, at the second functional unit from an instruction decoder, instructions requiring the second functionality and at least one of the subset of logical operations.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A processor core, comprising:
   a first functional unit configured to provide first functionality, wherein the first functional unit includes circuitry configured to perform a first set of logical operations;
   a second functional unit configured to provide second functionality different from the first functionality, wherein the second functional unit includes circuitry configured to perform a subset of logical operations of the first set of logical operations;
   a data bus connecting the first functional unit and the second functional unit; and
   an instruction decoder configured to transmit instructions to the second functional unit over the data bus, rather than the first functional unit, based on the instructions requiring the second functionality and at least one of the subset of logical operations, wherein the instructions would otherwise be routed to the first functional unit based on the instructions requiring the at least one of the subset of logical operations.

2. The processor core of claim 1, wherein:
   the first functional unit is a vector integer functional unit, and
   the first functionality is vector integer operation functionality.

3. The processor core of claim 1, wherein:
   the second functional unit is a cryptographic functional unit, and
   the second functionality is cryptographic functionality.

4. The processor core of claim 1, wherein the first set of logical operations is a set of logical vector integer operations.

5. The processor core of claim 1, wherein the first set of logical operations includes a logical XOR operation, a logical AND operation, a logical OR operation, one or more shift operations, a MOVE operation, or any combination thereof.

6. The processor core of claim 1, wherein the subset of logical operations includes a logical XOR operation, a MOVE operation, or any combination thereof.

7. A method of operating a processor core, comprising:
   performing, by a first functional unit of the processor core configured to provide first functionality, a first set of logical operations;
   performing, by a second functional unit of the processor core configured to provide second functionality different from the first functionality, a subset of logical operations of the first set of logical operations; and
   receiving, from an instruction decoder, at the second functional unit rather than the first functional unit, instructions requiring the second functionality and at least one of the subset of logical operations, wherein the instructions would otherwise be routed to the first functional unit based on the instructions requiring the at least one of the subset of logical operations.

8. The method of claim 7, wherein:

the first functional unit is a vector integer functional unit, and the first functionality is vector integer operation functionality.

9. The method of claim 7, wherein:

the second functional unit is a cryptographic functional unit, and the second functionality is cryptographic functionality.

10. The method of claim 7, wherein the first set of logical operations is a set of logical vector integer operations.

11. The method of claim 7, wherein the first set of logical operations includes a logical XOR operation, a logical AND operation, a logical OR operation, one or more shift operations, a MOVE operation, or any combination thereof.

12. The method of claim 7, wherein the subset of logical operations includes a logical XOR operation, a MOVE operation, or any combination thereof.

13. A processor core, comprising:

first means for providing first functionality, wherein the first means for providing first functionality includes circuitry configured to perform a first set of logical operations;

second means for providing second functionality different from the first functionality, wherein the second means for providing the second functionality includes circuitry configured to perform a subset of logical operations of the first set of logical operations;

a data bus connecting the first means for providing the first functionality and the second means for providing the second functionality; and an instruction decoder configured to transmit instructions to the second means for providing the second functionality over the data bus, rather than the first means for providing the first functionality, based on the instructions requiring the second functionality and at least one of the subset of logical operations, wherein the instructions would otherwise be routed to the first means for providing the first functionality based on the instructions requiring the at least one of the subset of logical operations.

14. The processor core of claim 13, wherein:

the first means for providing first functionality is a vector integer functional unit, and the first functionality is vector integer operation functionality.

15. The processor core of claim 13, wherein:

the second means for providing second functionality is a cryptographic functional unit, and the second functionality is cryptographic functionality.

16. The processor core of claim 13, wherein the first set of logical operations is a set of logical vector integer operations.

17. The processor core of claim 13, wherein the first set of logical operations includes a logical XOR operation, a logical AND operation, a logical OR operation, one or more shift operations, a MOVE operation, or any combination thereof.

18. The processor core of claim 13, wherein the subset of logical operations includes a logical XOR operation, a MOVE operation, or any combination thereof.

* * * * *